United States Patent
Legaignoux et al.

(10) Patent No.: US 7,374,133 B2
(45) Date of Patent: May 20, 2008

(54) WING HAVING A NEGATIVE DIHEDRON FOR TOWING A LOAD

(75) Inventors: Dominique Legaignoux, Las Terrenas (DO); Bruno Legaignoux, Las Terrenas (DO)

(73) Assignee: Diamond White Services de Consultaria Lda, Funchal, Madeira (PT)

( * ) Notice: Subject to any disclaimer, the term of this patent is extended or adjusted under 35 U.S.C. 154(b) by 359 days.

(21) Appl. No.: 11/067,842

(22) Filed: Feb. 28, 2005

(65) Prior Publication Data

US 2005/0230556 A1 Oct. 20, 2005

(30) Foreign Application Priority Data

Mar. 1, 2004 (FR) .................................. 04 02094

(51) Int. Cl.
*B64D 17/02* (2006.01)
(52) U.S. Cl. .................................. 244/145; 244/138 R
(58) Field of Classification Search ............ 244/138 R, 244/145, 142
See application file for complete search history.

(56) References Cited

U.S. PATENT DOCUMENTS

| | | |
|---|---|---|
| 2,737,360 A | 3/1956 | Allison |
| 4,129,272 A | 12/1978 | Jones et al. |
| 4,363,458 A | 12/1982 | Jones et al. |
| 5,120,006 A | 6/1992 | Hadzicki |
| 5,174,528 A | 12/1992 | Puskas |
| 5,366,182 A | 11/1994 | Roeseler et al. ............ 244/155 |
| 6,502,789 B2 | 1/2003 | Potvin |
| 6,520,454 B2 | 2/2003 | Winner |
| 6,659,031 B2 | 12/2003 | Legaignoux |
| 6,837,463 B2 | 1/2005 | Lynn |
| 7,014,149 B2 | 3/2006 | Lynn |
| 2002/0020784 A1 | 2/2002 | Potvin |
| 2002/0185570 A1 | 12/2002 | Winner |
| 2004/0004160 A1 | 1/2004 | Pouchkarev |

FOREIGN PATENT DOCUMENTS

| | | |
|---|---|---|
| DE | 202 20 025 U1 | 5/2003 |
| FR | 2639247 | 5/1990 |
| FR | 2645116 | 10/1990 |
| FR | 27775655 | 9/1999 |

OTHER PUBLICATIONS http://www.inflatablekite.com/sitebow/page1gb.php.*
Wardley, Andy; "The Camel goes Kite Surfing"; Presented at the O'Reilly Perl Conference 5; Jul. 23-27, 2001.

* cited by examiner

*Primary Examiner*—Timothy D Collins

(57) ABSTRACT

The wing (10) having a negative dihedron for towing a load comprises a flexible canopy (12) which is defined between two lateral ends (14A, 14B) which are connected to each other, at the front, by a leading edge (20) and, at the rear, by a trailing edge (22). The canopy (12) has, between those two lateral ends (14A, 14B), a propulsive central region (16) which is bordered at one side and the other by two control regions (18A, 18B). The wing comprises at least a member (30A, 30B) for suspending the load adjacent to each lateral end (14A, 14B) and auxiliary maintenance means (32) which are capable of flattening the propulsive central region (16) adjacent to the leading edge (20) during flight. The trailing edge (22) of the wing is generally concave.

15 Claims, 9 Drawing Sheets

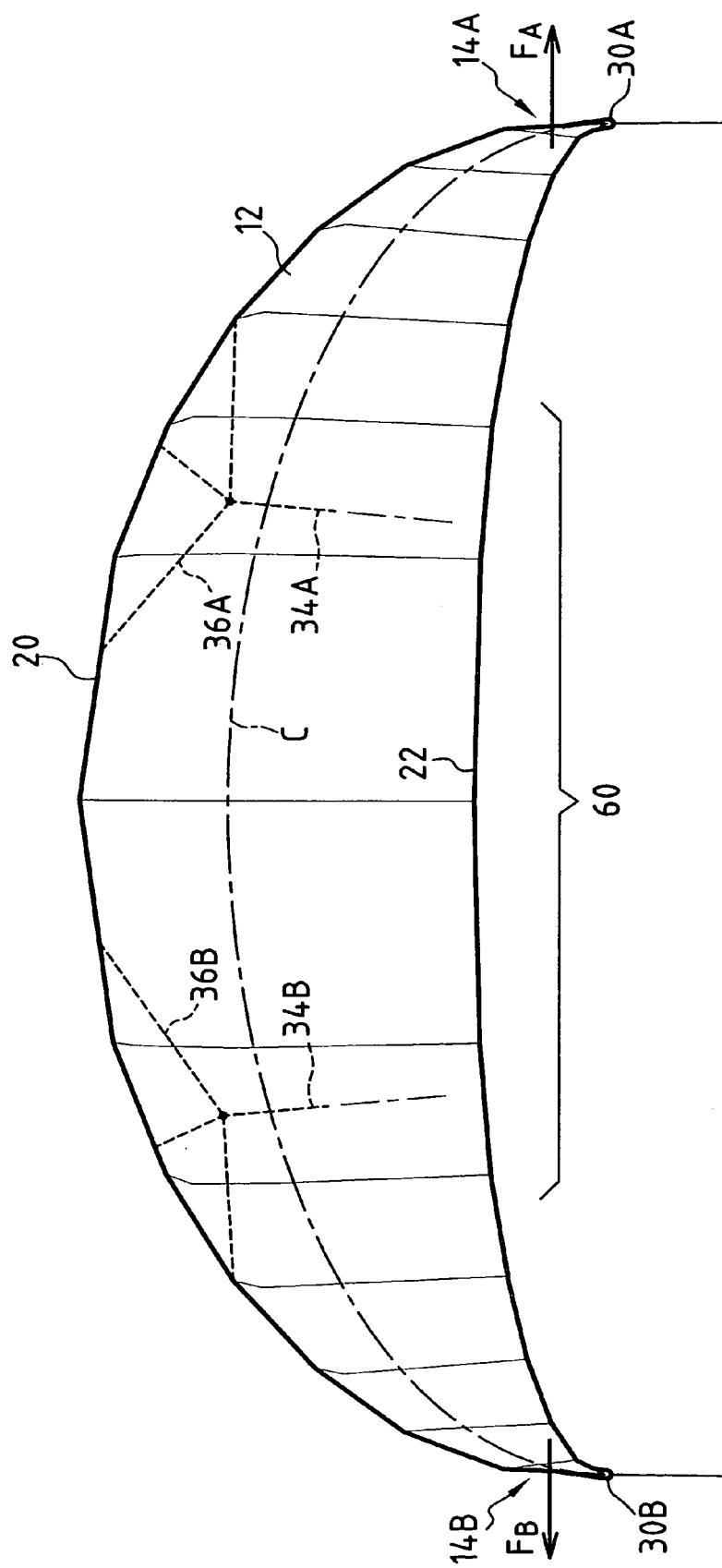

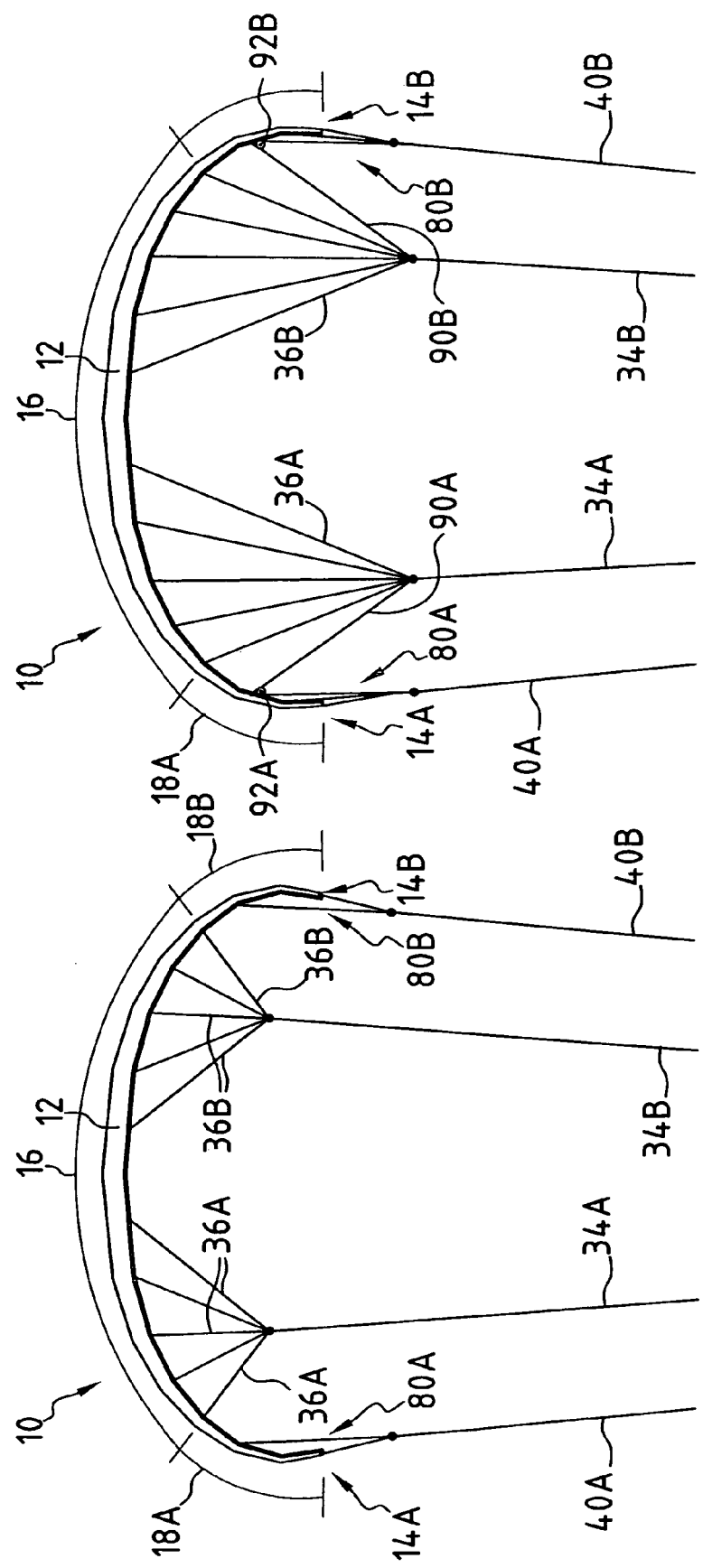

WING HAVING A NEGATIVE DIHEDRON FOR TOWING A LOAD

The present invention relates to a propulsive wing having a negative dihedron for towing a load, of the type comprising a flexible canopy which is defined between two lateral ends which are connected to each other, at the front, by a leading edge and, at the rear, by a trailing edge, the canopy having, between those two lateral ends, a propulsive central region bordered at one side and the other by two control regions, the wing comprising at least a member for suspending the load adjacent to each lateral end and auxiliary maintenance means which are capable of flattening the propulsive central region adjacent to the leading edge during flight.

It is known to use propulsive wings, sometimes referred to as "kites", for towing or lifting a load. Such propulsive wings are used in some gliding sports, in particular water sports. This is the case, for example, for the sport referred to as "kite boarding", where a user has his feet connected to a board which allows him to glide over the surface of the water, whereas the body of the user is connected to a propulsive wing, allowing him to move along.

Most propulsive wings currently used are constituted by a flexible canopy which has a pronounced negative dihedron and which is connected to the user by lines which are fixed to the lateral ends of the wing, or along the leading edge, that is to say that the lateral ends of the wing are located at a level lower than the central region of the wing during use. From the front, therefore, the wing is of an approximately semi-circular shape directed downwards, which shape is dictated by the wind or aerodynamic forces, and not by the rigidity of the structure.

A propulsive wing of this type is described, for example, in document EP-0.202.271. This wing is generally in the form of a spherical gore.

It is generally accepted that an increase in the effectiveness of the wing can be obtained by the canopy being flattened in the central region thereof. This flattening also increases the safety of the user if the wing is equipped with more than two flight lines, by allowing the profile to be opened and a greater reduction in the power of the wing when it is subjected to gusts of wind or when the user loses control of the wing. Since the front line(s) is/are fixed higher at the leading edge than at the wings in the form of a spherical gore, the rotation of the profile of the wing is greater when the rear lines are released.

In order to ensure such flattening of the central region of the wing, it has been proposed to provide the central region of the leading edge of the wing with a rectilinear spar which brings about the flattening of the leading edge of the wing.

It has been found that, during flight, the wing provided with such a spar has a flattened leading edge, whereas the trailing edge tends to retain its foiled shape. As a result, the two control regions which border the central region of the wing are excessively inclined towards each other and towards the rear of the wing, producing great drag which reduces the speed of the wing. Such a wing has been proposed in particular under the GAASTRA mark.

Furthermore, a wing marketed under the FLEX mark has an assembly of shroud lines which form bridles which are fixedly joined only along the leading edge of the wing. A rigid spar further brings about the central flattening of the leading edge. The wing is generally in the form of an ellipsoid gore with a leading edge and a trailing edge which are convex. During flight, a slight but modest flattening of the leading edge is found, whereas the trailing edge is not flattened at all and retains a foiled shape. As for the preceding wing, this arrangement brings about great drag.

Another proposed solution consists in providing the wing, over the majority of the surface-area of the canopy, with shroud lines which form bridles. These shroud lines are regularly distributed over the surface-area of the canopy in rows which extend from the leading edge to the trailing edge. They are gathered directly or indirectly at the user. The plurality of shroud lines connected to the canopy increases the aerodynamic drag and produces, in the canopy, foils between each row of bridles so that the effectiveness of the wing is reduced.

The object of the invention is to provide a propulsive wing whose propulsive central region is relatively flat, both in the region of the leading edge and the trailing edge, and is completely tensioned without impairing aerodynamic effectiveness.

To this end, the invention relates to a propulsive wing having a negative dihedron for towing a load, of the type mentioned above, characterized in that the trailing edge of the wing is generally concave.

According to specific embodiments, the propulsive wing comprises one or more of the following features:

- the canopy has, during flight, when viewed from above, a shape which is generally arched towards the trailing edge;
- the central region is not provided, except for adjacent to the leading edge, with any auxiliary maintenance means which is capable of flattening the propulsive central region during flight;
- the aspect ratio of the wing is greater than 3;
- the thrust centre of each section of the control regions is behind the thrust centre of each section of the propulsive central region;
- the auxiliary maintenance means of the propulsive central region comprise at least a line which is connected by one end to the propulsive central region adjacent to the leading edge and which is capable of being connected to the load at the other end thereof;
- the or each line comprises an assembly of shroud lines which are gathered at one end at the load to be towed and the other ends of which are connected to the propulsive central region, being distributed over the length of the leading edge;
- the auxiliary maintenance means of the propulsive central region adjacent to the leading edge comprise a stiffening spar which is fixedly joined over the leading edge;
- the line of the thrust centres of the sections of the canopy during flight, from one lateral end to the other, describes the shape of a curve whose centre of curvature, at any location, is located at the side of the trailing edge;
- the wing includes rear lines which are connected to the suspension members which are arranged at the lateral ends of the wing, the auxiliary maintenance means of the propulsive central region comprising at least a front line which is connected by one end to the propulsive central region adjacent to the leading edge and which is capable of being connected to the load at the other end thereof, the or each front line comprising an assembly of shroud lines which are applied to the propulsive central region at locations which are distributed over the length of the leading edge, at least one sliding shroud line being engaged in a sliding manner in a guide which is fixedly joined to the leading edge, the end of the sliding shroud line being fixedly joined to a rear line;

the guide is supported in a sliding manner on a deformable loop which is connected at two locations which are spaced from the leading edge;

the wing comprises rear lines which are connected to the suspension members which are arranged at the lateral ends of the wing, the auxiliary maintenance means of the propulsive central region comprising at least a shroud line which is connected, at one end, to the leading edge and, at the other end thereof, to a rear line;

it comprises an operating device which comprises a control bar, the ends of which are connected to the lateral ends of the canopy by rear lines and at least a towing line which is connected to the canopy in front of the rear lines by at least a front line, which towing line comprises means for connection to the body of the user, which connection means comprise at least a pulley which is engaged in a loop of the or each towing line whose end is fixedly joined to the control bar, the pulley comprising means for connecting the axle thereof to the body of the user; and the means for connecting the axle of the pulley to the body of the user comprise a complementary pulley which is engaged in a loop of a return strand, one end of which is fixed to the axle of the pulley and the other end of which is fixed to the or each towing line, the complementary pulley comprising means for connecting the axle thereof to the body of the user.

The invention will be better understood from a reading of the description below which is given purely by way of example and with reference to the drawings, in which:

FIG. 4 is a plan view of the wing of the preceding Figures, that is to say, as a flat projection;

FIGS. 6, 7 and 8 are front views of variants of the propulsive wing according to the invention;

The propulsive wing 10 illustrated in FIGS. 1 to 4 is intended for towing a load, such as a sports enthusiast whose feet are fixedly joined to a board. The propulsive wing comprises a flexible canopy 12 which is defined between two lateral ends 14A, 14B. The canopy 12 has, between its two lateral ends 14A, 14B, a propulsive central region 16 which is bordered at one side and the other by two control regions 18A, 18B.

Figure 2:
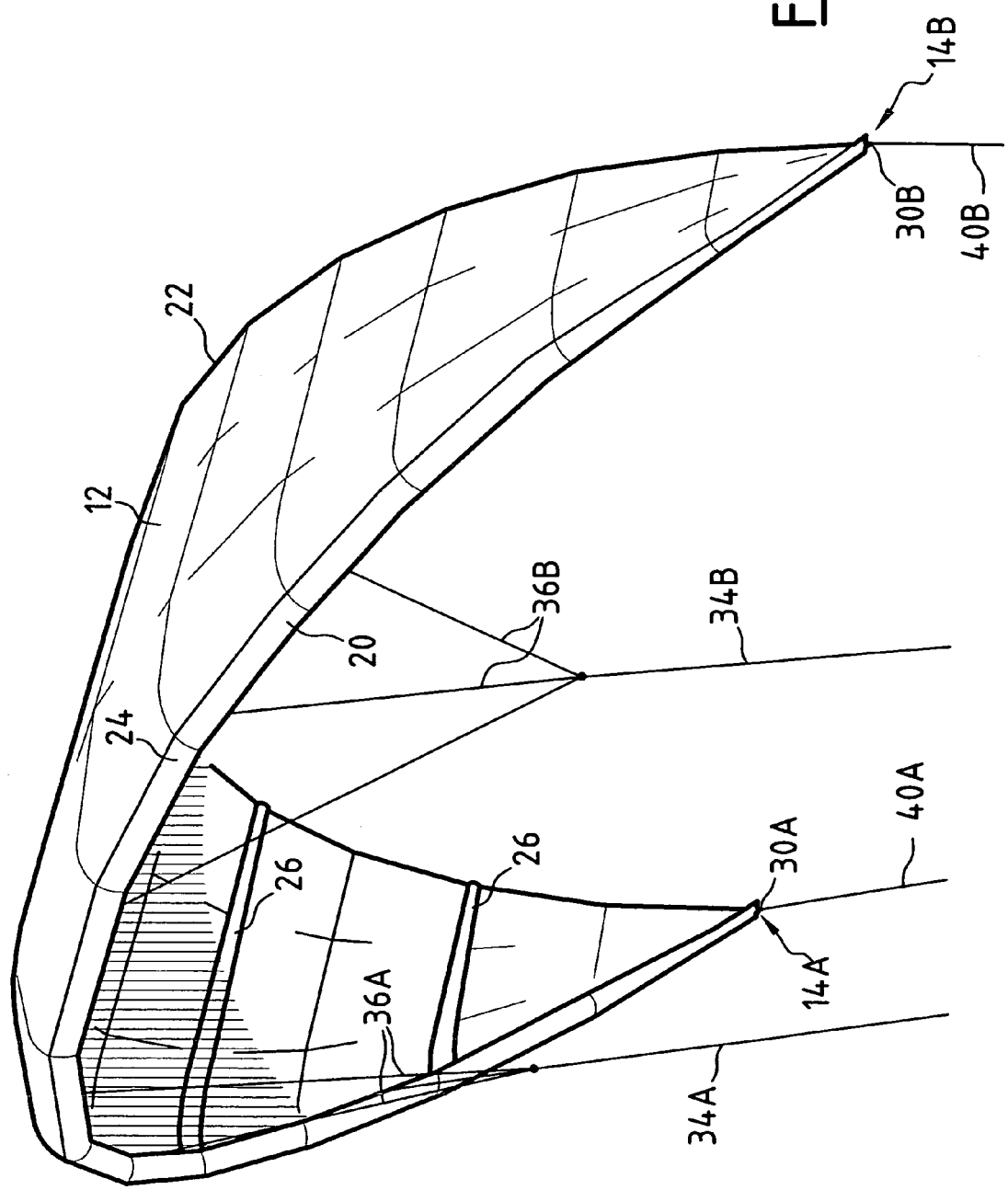
FIG. 2 is a perspective view of the wing of FIG. 1 illustrated during flight.

The canopy 12 has, at the front, a leading edge 20 and, at the rear, a trailing edge 22 which can be seen in FIG. 2. They both extend from one lateral end 14A to the other 14B. The canopy 12 extends between the two edges 20, 22 in order to define a continuous left-hand region.

The propulsive wing is in the form of a negative dihedron, that is to say that it has, when viewed from the front, an arched shape whose concavity is directed towards the suspended load.

In greater detail, the two control regions 18A, 18B are located at a level lower than that of the propulsive region 16.

Figure 3:
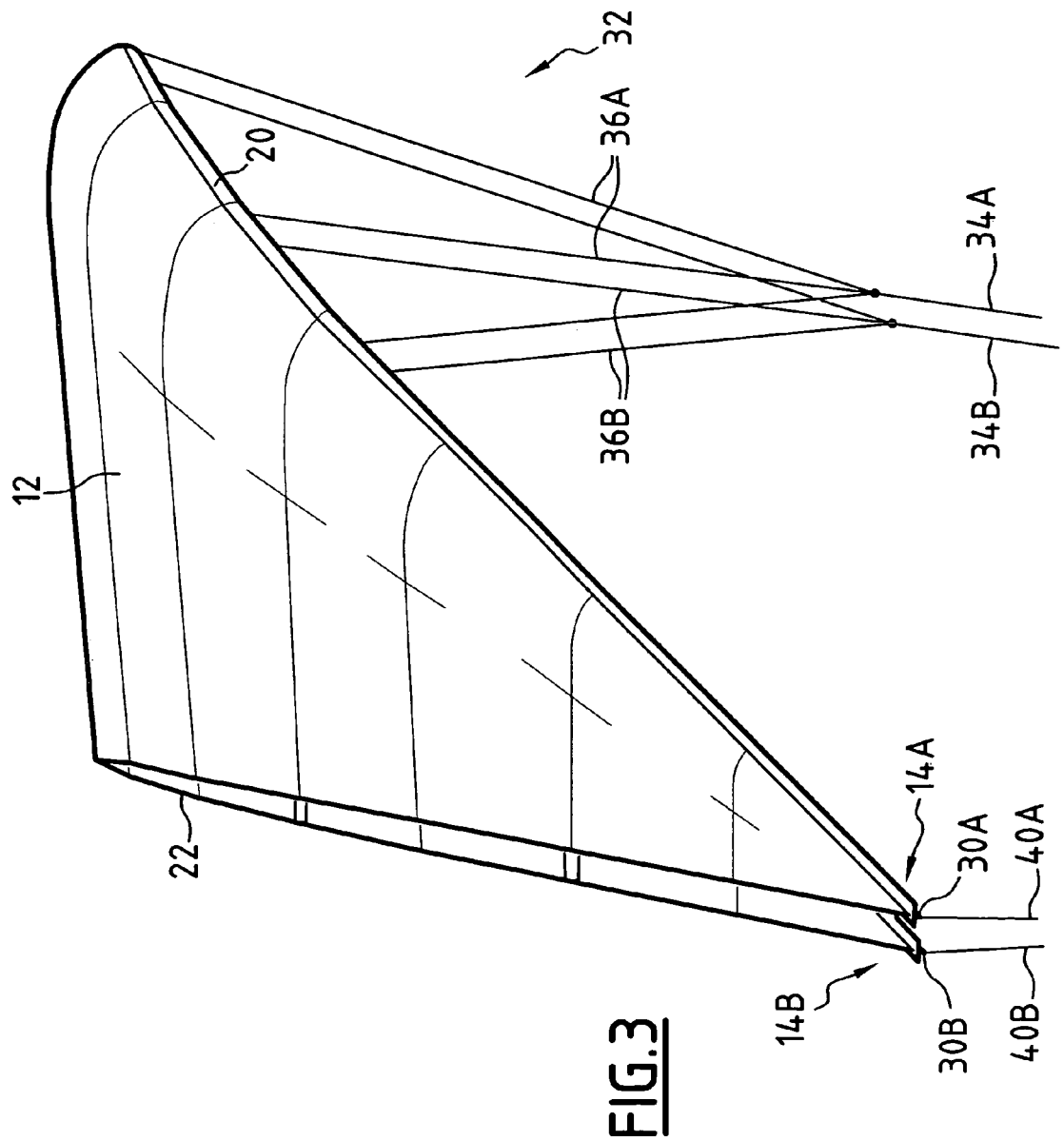
FIG. 3 is a side view of the wing of FIGS. 1 and 2, illustrated during flight.

As illustrated in FIGS. 3 and 4, the width of the canopy, measured longitudinally between the leading edge 20 and the trailing edge 22, decreases symmetrically from the central region of the wing as far as the lateral ends 14A, 14B. Over the leading edge of the wing, the canopy 12 is supported by a main inflated roll 24 which extends from one lateral end 14A to the other lateral end 14B. This roll is generally in the form of a flattened crescent moon. Its diameter becomes progressively smaller from the central region towards the ends thereof. The canopy is fixedly joined at the front along the inflated roll 24.

Longerons 26 are distributed regularly over the length of the main roll 24 and extend from the leading edge 20 to the trailing edge 22 of the wing. They are each constituted by an inflated roll. These rolls are connected, at the front end thereof, to the main roll 24. The canopy 12 is fixedly joined to the longerons 26 over the entire length thereof, these longerons being located below the canopy, that is to say, at the side of the load to be towed.

At each of the lateral ends, the propulsive wing comprises a member 30A, 30B for suspending the load to be towed. This member is constituted, for example, by a ring for anchoring a shroud line, or by a strap stitched to the end of the canopy.

The profile-sections, that is to say, the longitudinal sections of the canopy 12 can be of any known aerodynamic shape; they do not need a specific aerodynamic shape for the wing to function according to the invention. They are advantageously concave, that is to say that their curvature does not comprise any inflexion point, the curvature always being orientated in the same direction.

According to the invention, the trailing edge has, when viewed from above, a shape which is generally arched towards the rear or a generally concave shape.

The leading edge 20 is alone in being associated with auxiliary maintenance means 32 which can flatten the central region of the leading edge 20 during flight. These maintenance means 32 are applied adjacent to the leading edge.

According to the present document, the term "adjacent to the leading edge" means along the leading edge or between the leading edge and the line of the thrust centres of the wing, the maintenance means thus being in front of the thrust centre of each section in the sense of advance of the wing.

FIG. 4 illustrates, by means of line C, the position of the thrust centre which is associated with each (profile-section or section) of the canopy over the length of the canopy from one lateral end 14A to the other 14B.

The shape of the canopy arched towards the rear is obtained when the thrust centre is located further forward as the section in question moves nearer the longitudinal axis of the wing. In particular, the thrust centre of a section of the control regions 18A, 18B is behind the thrust centre of a section of the propulsive central region 16 of the wing.

Figure 1:
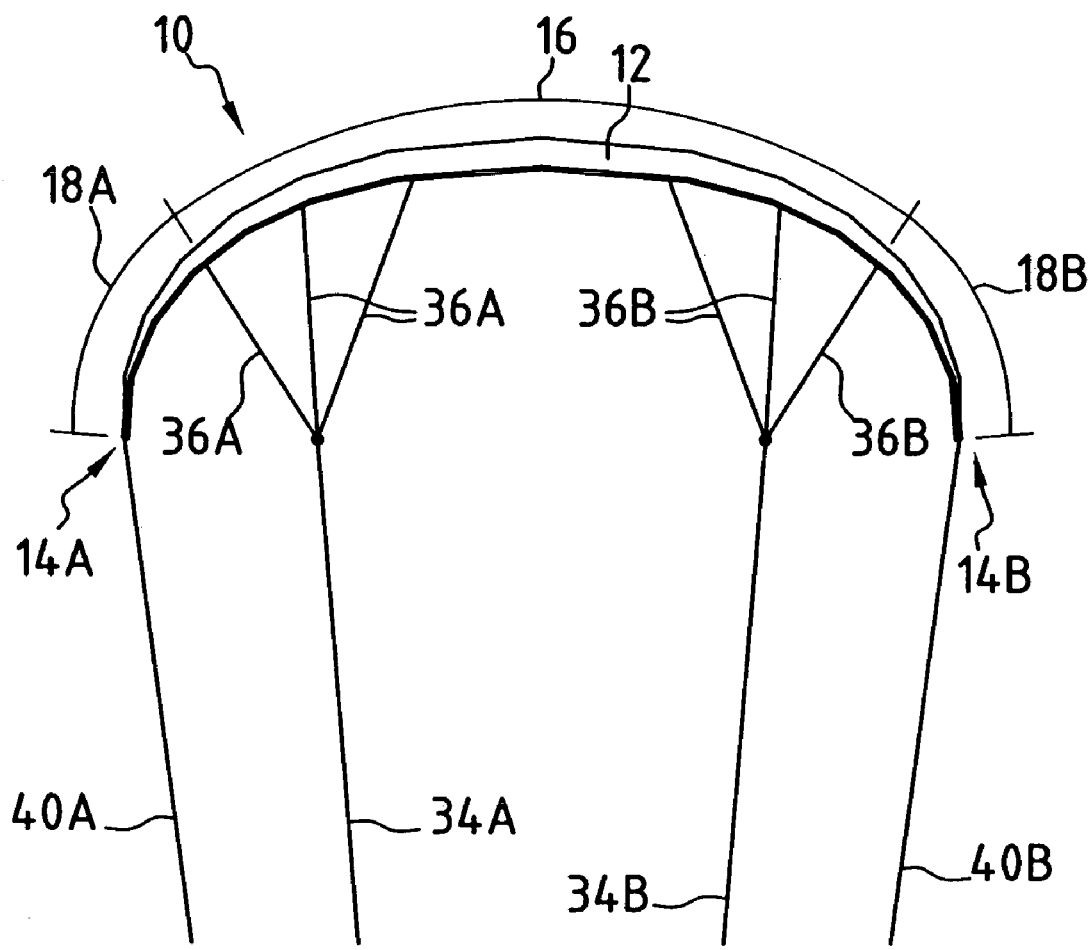
FIG. 1 is a front view of a propulsive wing according to the invention, illustrated during flight.

As illustrated in FIGS. 1 and 3, the auxiliary maintenance means 32 which can flatten the front portion of the central region of the wing during flight comprise, for example, two front lines 34A, 34B which each comprise a group of three converging shroud lines 36A, 36B which are connected together by a common end. The other end of each shroud line is connected at a location adjacent to the leading edge 20. The various locations for connecting the shroud lines 36A, 36B at the leading edge 20 are distributed over the length of the central portion thereof.

The shroud lines 36A, 36B of each group are connected together to form a front line 34A, 34B which is itself fixedly joined to the load to be towed.

The length of the various shroud lines 36A, 36B is selected so that, by the free end of the front lines 34A, 34B being pulled, the shroud lines connected in the central region of the canopy bring about greater retention of the canopy than the shroud lines arranged at the ends of that central region, thereby ensuring flattening of the leading edge of the canopy in the propulsive central region thereof.

By way of a variant, the auxiliary maintenance means 32 comprise, not shroud lines, but instead a rigid spar which is attached to the leading edge or adjacent to the leading edge, thereby ensuring maintenance of the leading edge in the central region of the wing along a generally rectilinear profile.

In order to bring about the towing of the load, and as known per se, the load is connected to the lateral ends 14A, 14B by two additional rear lines 40A, 40B which are fixedly joined to the suspension members 30A, 30B, and is connected to the front of the central region by at least a line.

With such a wing, it will be understood that the presence of the auxiliary maintenance means 32 adjacent only to the leading edge is sufficient to bring about flattening of the canopy in the central region of the leading edge.

During flight, the canopy is further urged by a lifting force which generally extends perpendicularly to the surface of the canopy. The control regions 18A, 18B are thus subjected to opposite lifting forces $F_A$, $F_B$. These forces are applied to the central region of the trailing edge, which region is designated 60 in FIG. 4. This central region 60 is kept tensioned by the action of the opposite lifting forces $F_A$, $F_B$ which are applied to the control regions 18A, 18B. This tension leads to flattening of the central region of the trailing edge, simply owing to the backward offset arrangement of the control regions, which offset arrangement is connected with the generally concave trailing edge.

In that the leading edge 22 is kept flattened in the central region thereof by the auxiliary maintenance means and the rear propulsive portion adjacent to the trailing edge is also flattened by the action of the opposite lifting forces which are applied to the control regions located towards the rear, the entire central propulsive region 16 of the canopy is kept flattened although auxiliary maintenance means are applied adjacent only to the leading edge.

The homogeneous flattening of the propulsive central region of the canopy allows the control regions to be maintained approximately parallel relative to each other, allowing a good flow of the air stream around the wing and preventing excessively large drag of the wing.

Furthermore, since the propulsive central region 16 is not provided with auxiliary maintenance means, except for adjacent to the leading edge 20 thereof, the wing has good aerodynamic properties owing to the very high level of regularity of the surface thereof.

For such a wing, the aspect ratio of the wing is greater than 3. The aspect ratio is equal to the square of the wing span divided by the surface-area of the wing. The wing span is arbitrarily selected as being that of the deflated wing in the flat state and the surface-area is the developed surface-area of the canopy.

Figure 4A:
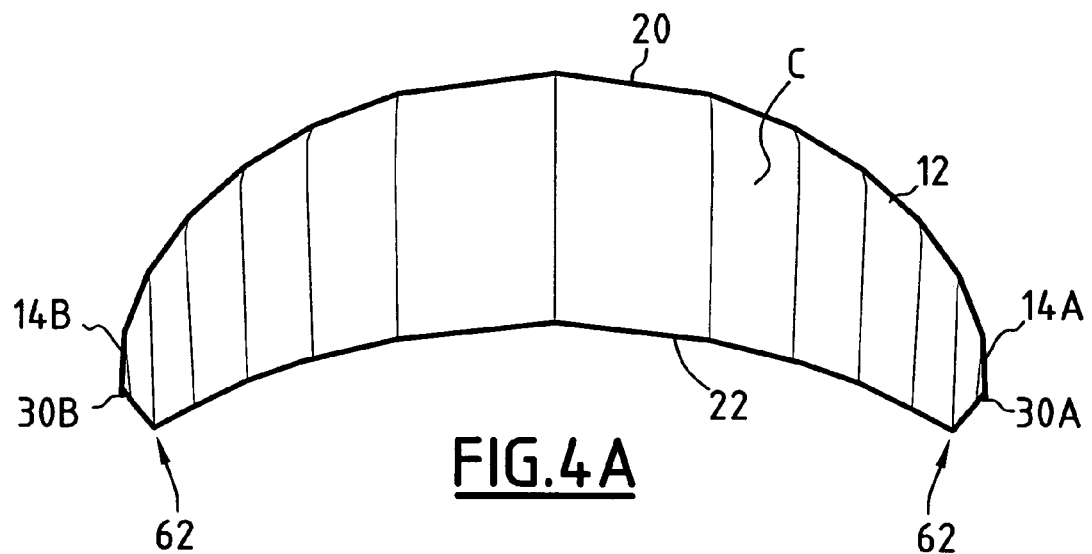
FIGS. 4A and 4B are views identical to that of FIG. 4 of variants of the shape of the wing.

In the variant of the wing according to the invention illustrated in FIG. 4A, the curvature of the trailing edge 22 is inverted only in the immediate vicinity of the ends thereof over a length of a few tens of centimetres in a region designated 62.

Figure 4B:
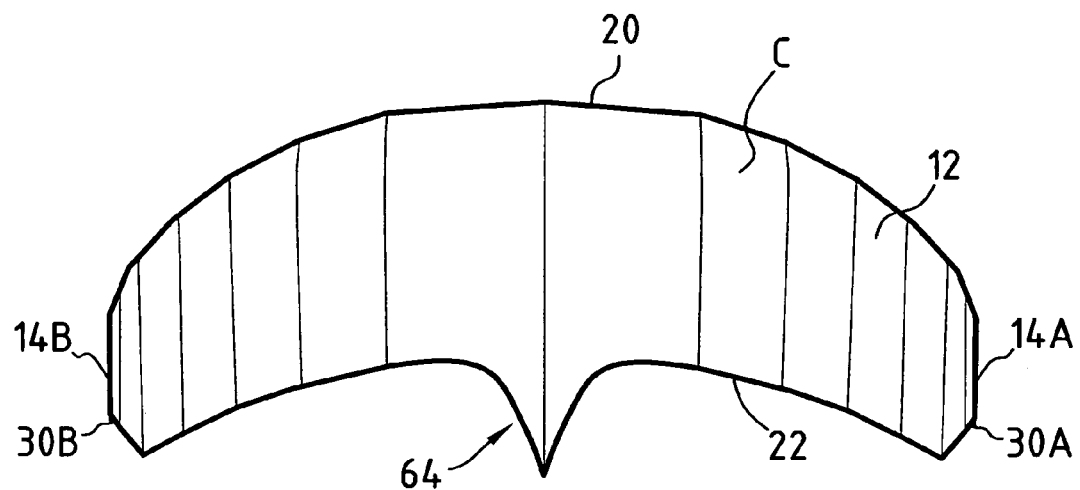

In the variant of the wing according to the invention illustrated in FIG. 4B, the curvature of the trailing edge 22 is inverted only in the immediate vicinity of the centre axis of the wing in order to form a central tail 64 having a width of a few tens of centimetres.

In this manner, in the various variants, the trailing edge is of a generally concave shape, thereby allowing flattening of the trailing edge in the propulsive central region, even if, locally, this trailing edge is not concave.

Figure 5:
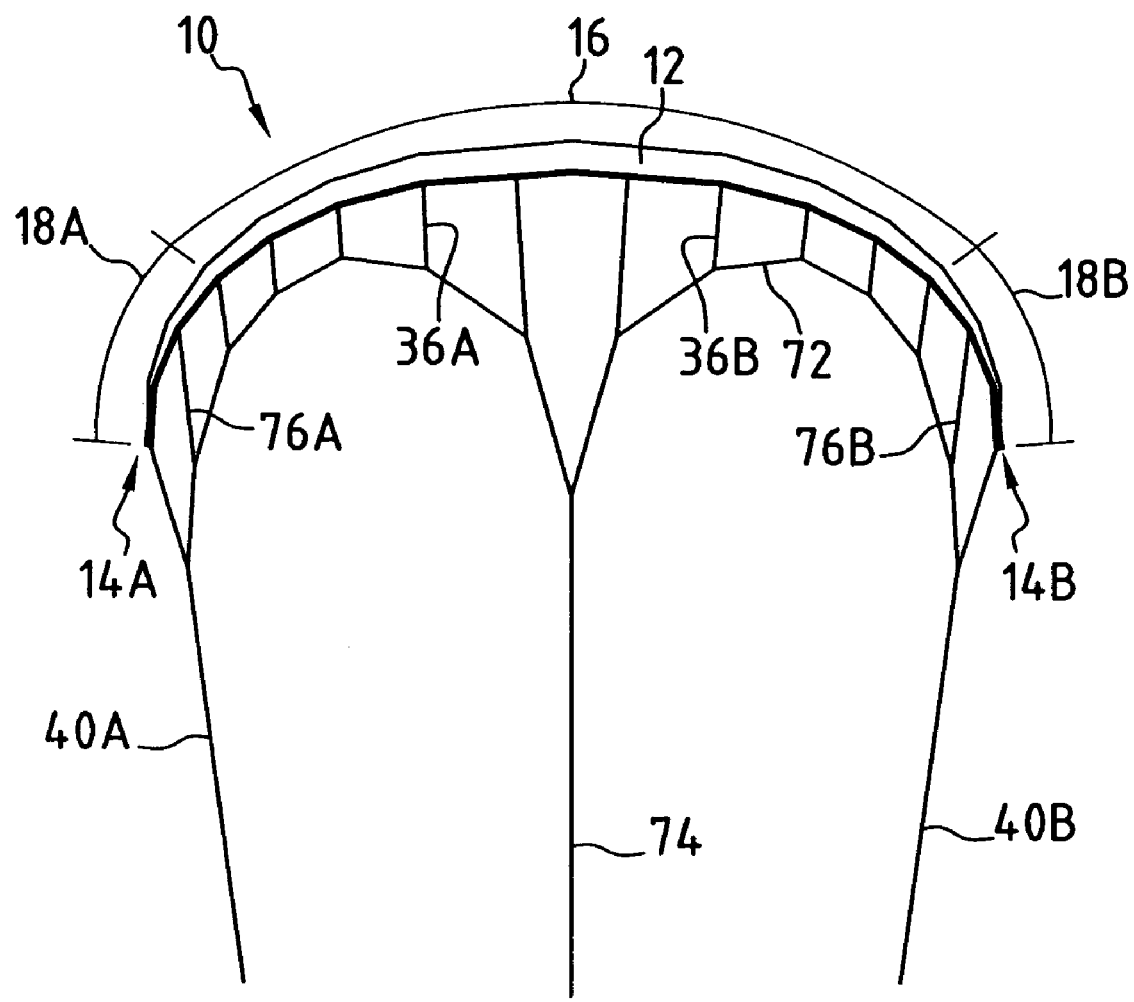
FIG. 5 is a front view of a variant of a wing according to the invention.

According to another variant illustrated in FIG. 5, the wing comprises only one front line which is arranged in a central position adjacent to the leading edge and two rear lines.

In this embodiment, the shroud lines 36A, 36B, one end of which is fixed to the central region of the leading edge, are regularly distributed over the entire length of the central region of the leading edge. They are connected to each other by a connection line 72.

A single central front line 74 is fixedly joined to the connection line 72 in the longitudinal centre plane of the wing, that is to say, perpendicularly to the central portion of the leading edge.

Furthermore, the control regions 18A, 18B are also provided, over the leading edge 20, with shroud lines 76A, 76B which are distributed as far as the ends of the leading edge. These shroud lines are connected to each other and to the shroud lines 36A, 36B by the continuation at one side and the other of the connection line 72.

The shroud lines 76A, 76B and the ends of the connection line 72 are connected to the rear lines 40A, 40B.

According to another variant illustrated in FIG. 6, the shroud lines 36A, 36B terminate in groups at the front lines 34A, 34B. There are five shroud lines. Furthermore, one or more shroud line(s) 80A, 80B terminate at the rear lines 40A, 40B. These shroud lines 80A, 80B which terminate at the rear lines are connected, at the other end thereof, to the leading edge 20 adjacent to the ends thereof, that is to say, near the lateral ends 14A, 14B of the canopy.

In the embodiment of FIG. 7, five shroud lines 36A, 36B terminate in groups at the front lines 34A, 34B.

Furthermore, an additional line 90A, 90B which forms a shroud line is engaged in a pulley 92A, 92B which forms a guide which is fixed at the leading edge 20. This shroud line 90A, 90B connects the front line 34A, 34B to the rear line 40A, 40B which is arranged at the same side.

These pulleys 92A, 92B are fixed to the leading edge 20 between the shroud lines 36A, 36B which are connected to the front lines and the shroud lines 80A, 80B which are connected to the rear lines when there are provided such shroud lines connected to the rear lines.

Figure 8:
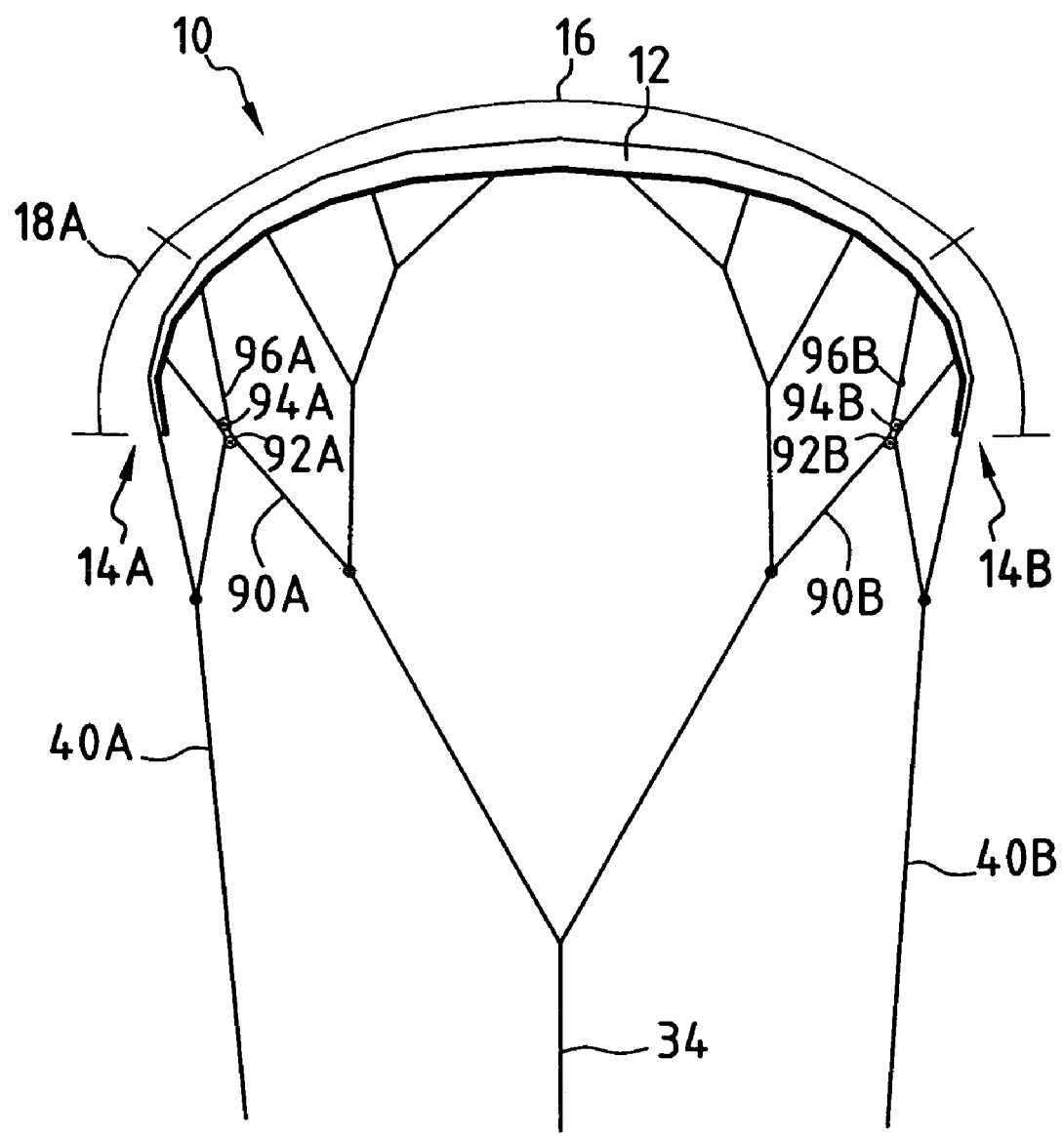

A variant is illustrated in FIG. 8. In this embodiment, the pulleys 92A, 92B are themselves carried by associated pulleys 94A, 94B. These pulleys 94A, 94B are engaged in a sliding manner on a loop 96A, 96B which is formed by a deformable strand, the ends of which are connected to the leading edge 20 at spaced-apart locations.

As in the preceding embodiment, the shroud lines 90A, 90B are connected, at one end, to the rear lines 40A, 40B and, at their other end, they terminate at a single front line 34.

When the canopy is used, the pulleys 92A, 92B and 94A, 94B are displaced over the length of the loops 96A, 96B, whereas the shroud lines 90A, 90B slide in the pulleys 92A, 92B, allowing a balanced distribution of the forces taken up by the shroud lines 90A, 90B between the front and rear lines.

An arrangement as described in FIGS. 6, 7 and 8 can be used with any type of wing and in particular with a wing whose trailing edge is not concave.

For using such a towing wing, the four lines 34A, 34B, 40A and 40B or the three lines 74, 40A, 40B can terminate in an identical location at the load to be towed, the rear lines being controlled in terms of length in order to direct the wing. By way of a variant, the two front lines are fixed together and the two rear lines are fixed to a bar, or the four lines are fixed to a bar, the two front lines extending into a pulley which is located lower than the bar, etc.

Figure 9:
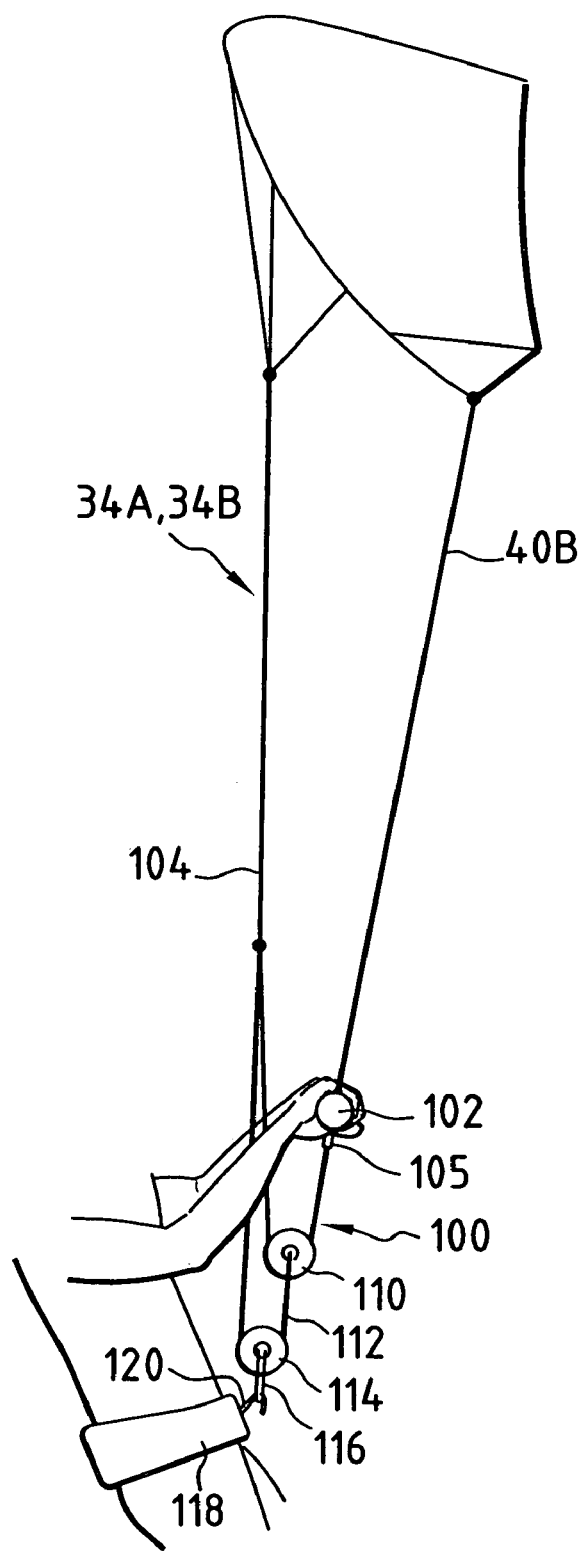
FIG. 9 is a schematic perspective view of a device for operating the propulsive wing according to the invention, the wing being illustrated at a reduced size.
Figure 10:
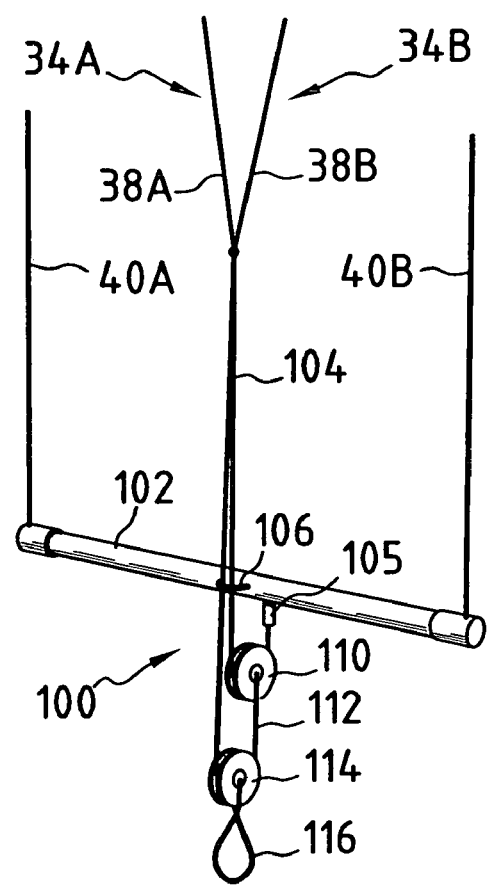
FIG. 10 is a perspective view of the operating device of FIG. 9.

Advantageously, however, these lines are connected to an operating device 100 as illustrated in FIGS. 9 and 10. This operating device 100 can be used with other types of wing.

The device 100 comprises a generally rectilinear control bar 102 which is intended to be held at arm's length by the user. The rear shroud lines 40A, 40B which are fixedly joined to the lateral ends of the wing 14A, 14B are connected to the ends of the bar 102.

Furthermore, the lower ends of the front lines 34A, 34B which bring about the maintenance of the leading edge 20 of the wing are connected to each other and are extended by a common towing line 104, the other end of which is fixedly joined at 105 in the central region of the bar 102.

If a single front line 74 is provided, it constitutes the common towing line 104.

The common towing line 104 is mounted in a sliding state through a ring 106 which is fixedly joined to the bar 102 in the central region thereof. A first pulley 110 is engaged on the towing line 104 and is maintained in a lower loop of this line between the connection point 105 and the ring 106. The axle of the pulley 110 is fixedly joined to the end of a return strand 112, the other end of which is fixedly joined to the common towing line 104 in the portion contained between the ring 106 and the end for connection to the front lines 34A, 34B.

A second pulley 114 is engaged on the return strand 112 in a lower loop thereof. The axle of the pulley 114 is provided with a loop 116 for attaching the operating device to a harness 118 which is provided with a hook 120 which is carried by the user or the load to be towed.

The displacement of the control bar 102 over the length of the common towing line 104 which is fixedly joined to the harness allows control of the canopy to be ensured, and in particular the inclination thereof relative to the horizontal, owing to the modification of the relative position in terms of height of the central region of the leading edge and the lateral ends of the wing.

Furthermore, the tilting of the control bar 102 to the right or to the left allows the wing to be directed by the action of the control regions 18A, 18B.

Owing to the presence of the two pulleys 110, 114, the force to be applied by the user to displace the bar 102 along the line 104 is reduced to only 25% of that which would have had to be applied if the end of the line 104 were connected directly to the harness without any pulley. With the arrangement described, 75% of the traction force applied by the wing is applied directly to the harness and not to the control bar 102, owing to the recovery of effort carried out by the pulleys.

The invention claimed is:

1. Wing (10) having a negative dihedron for towing a load, comprising a flexible canopy (12) which is defined between two lateral ends (14A, 14B) which are connected to each other, at the front, by a leading edge (20) and, at the rear, by a trailing edge (22), the canopy (12) having, between those two lateral ends (14A, 14B), a propulsive central region (16) bordered at each of its lateral sides by a respective control regions (18A, 18B), the wing comprising at least a member (30A, 30B) for suspending the load adjacent to each lateral end (14A, 14B), said auxiliary maintenance means (32) which are capable of flattening the propulsive central region (16), said auxiliary maintenance means being located adjacent to the leading edge (20) during flight,—wherein the trailing edge (22) of the wing is generally concave when viewed from above.

2. Wing according to claim 1, wherein the central region (60) is not provided, except for adjacent to the leading edge (20), with any auxiliary maintenance means which is capable of flattening the propulsive central region (16) during flight.

3. Wing according to claim 1, wherein the aspect ratio of the wing is greater than 3.

4. Wing according to any claim 1, wherein the thrust centre of each section of the control regions (18A, 18B) is behind the thrust centre of each section of the propulsive central region (16).

5. Wing according to claim 1, wherein the auxiliary maintenance means (32) of the propulsive central region (16) comprise at least a line (34A, 34B) which is connected by one end to the propulsive central region (16) adjacent to the leading edge (20) and which is capable of being connected to the load at the other end thereof.

6. Wing according to claim 5, wherein each line (34A, 34B) comprises an assembly of shroud lines (36A, 34B) which are gathered at one end at the load to be towed and the other ends of which are connected to the propulsive central region (16), being distributed over the length of the leading edge (20).

7. Wing according to claim 1, wherein the auxiliary maintenance means (32) of the propulsive central region (16) adjacent to the leading edge (20) comprise a stiffening spar which is fixedly joined over the leading edge (20).

8. Wing according to claim 1, wherein the line (C) of the thrust centres of the sections of the canopy (12) during flight, from one lateral end to the other (14A, 14B), describes the shape of a curve whose centre of curvature, at any location, is located at the side of the trailing edge (22).

9. Wing according to claim 1, further comprising rear lines (40A, 40B) which are connected to the suspension members (30A, 30B) which are arranged at the lateral ends (14A, 14B) of the wing, and at least a shroud line (80A, 80B) which is connected, at one end, to the leading edge (20) and, at the other end thereof, to at least one of the rear lines (40A, 40B).

10. Wing according to claim 1, further comprising rear lines (40A, 40B) which are connected to the suspension members (30A, 30B) which are arranged at the lateral ends (14A, 14B) of the wing, and wherein the auxiliary maintenance means (32) of the propulsive central region (16) comprise at least a front line (34A, 34B) which is connected by one end to the propulsive central region adjacent to the leading edge (20) and which is capable of being connected to the load at the other end thereof, each front line (34A, 34B) comprising an assembly of shroud lines (36A, 36B; 90A, 90B) which are applied to the propulsive central region (16) at locations which are distributed over the length of the leading edge (20), at least one sliding shroud line (90A, 90B) being engaged in a sliding manner in a guide (92A, 92B) which is fixedly joined to the leading edge (20), the end of the sliding shroud line (90A, 90B) being fixedly joined to at least one of the rear lines (40A, 40B).

11. Wing according to claim 9, wherein the guide (92A, 92B) is supported in a sliding manner on a deformable loop (96A, 96B) which is connected at two locations which are spaced from the leading edge (20).

12. Wing according to claim 1, further comprising an operating device (100) which comprises a control bar (102), the ends of which are connected to the lateral ends (14A, 14B) of the canopy (12) by rear lines (40A, 40B) and at least a towing line (104) which is connected to the canopy (12) in front of the rear lines (40A, 40B) by at least a front line (34A, 34B), which towing line (104) comprises means for connection to the body of a user during use of the wing, which connection means comprise at least a pulley (110) which is engaged in a loop of each towing line (104) whose end is fixedly joined to the control bar (102), the pulley (110) comprising means (112,114,116) for connecting the axle thereof to the body of the user.

13. Wing according to claim 12, wherein the means for connecting the axle of the pulley (110) to the body of the user comprise a complementary pulley (114) which is engaged in a loop of a return strand (112), one end of which is fixed to the axle of the pulley (110) and the other end of which is fixed to the or each towing line (104), the complementary pulley (114) comprising means (116) for connecting the axle thereof to the body of the user.

14. Wing according to claim 1, wherein, in longitudinal section, the canopy (12) is concave.

15. Wing according to claim 1, wherein the auxiliary maintenance means (32) are arranged only between the leading edge (20) and the line (C) of the thrust centres of the canopy.

* * * * *

UNITED STATES PATENT AND TRADEMARK OFFICE
CERTIFICATE OF CORRECTION

| | | |
|---|---|---|
| PATENT NO. | : 7,374,133 B2 | Page 1 of 1 |
| APPLICATION NO. | : 11/067842 | |
| DATED | : May 20, 2008 | |
| INVENTOR(S) | : Dominique Legaignoux et al. | |

It is certified that error appears in the above-identified patent and that said Letters Patent is hereby corrected as shown below:

In the claims,
In Claim 1 at Column 8, Line 4, "said" should be corrected to --and--

Signed and Sealed this
Sixteenth Day of February, 2016

Michelle K. Lee
*Director of the United States Patent and Trademark Office*